United States Patent [19]
Voitov

[11] 3,729,658
[45] Apr. 24, 1973

[54] CIRCULAR ROTARY MAGNETIC CHUCK FOR METAL-WORKING MACHINES

[76] Inventor: Ivan Andreevich Voitov, ulitsa 9 Yanvarya, 91, kv. 65, Voronezh, U.S.S.R.

[22] Filed: June 9, 1972

[21] Appl. No.: 261,541

[52] U.S. Cl. ............... 317/157.5, 335/289, 335/290
[51] Int. Cl. ............................................. H01f 13/00
[58] Field of Search ....................... 317/157.5 CL; 335/288, 289, 290

[56] References Cited

UNITED STATES PATENTS

| | | | |
|---|---|---|---|
| 1,484,090 | 2/1924 | Simmons | 335/290 |
| 1,544,695 | 7/1925 | Spencer | 335/290 X |
| 1,628,618 | 5/1927 | Spencer | 317/157.5 X |
| 3,209,891 | 10/1965 | Littwin | 317/157.5 X |
| 3,219,888 | 11/1965 | Waring | 335/290 X |
| 3,340,442 | 9/1967 | Braillon | 335/290 X |

*Primary Examiner*—William M. Shoop, Jr.
*Attorney*—Eric H. Waters et al.

[57] ABSTRACT

In the chuck body adapted to rotate on the base, there are located electromagnets which, when the chuck rotates, get successively connected by the contact system to working voltage within the workpiece machining zone and to demagnetizing voltage within the workpiece unloading zone.

The chuck contact system comprises the ring commutator held on the chuck body and current-carrying brushes adapted to interact therewith and fixed to the chuck bed at the boundaries of the zone, whereas cut into the circuit of the electromagnets are semiconductor diodes capable of admitting current to pass therethrough within the workpiece machining zone and not admitting it to flow within the workpiece loading zone.

3 Claims, 3 Drawing Figures

CIRCULAR ROTARY MAGNETIC CHUCK FOR METAL-WORKING MACHINES

This invention relates generally to the art of machine building and more specifically to a circular rotary magnetic chuck used in metal-working machines and adapted to carry workpieces machined on continous-acton machine tools.

The present invention can find preferential application in automatic surface grinding machines, wherein no heavy claimping forces are necessary for clamping workpieces being machined.

Known in the art some circular rotary magnetic chucks for metal-working machines, said chucks having loading, machining and unloading zones and comprising: a bed with ways on which a circular chuck body is free to rotate, said body carrying electromagnets spaced equidistantly along the periphery thereof and connected in series to one another; an adapter cover mounted on the body; and a contact system which, when the chuck body rotates, successively energizes the electromagnets with the working voltage within the zone of workpieces machining for the latter to be clamped on the chuck cover or deenergizes the electromagnets to facilitate taking off of the workpieces within the zone of unloading thereof.

In the magnetic chucks under discussion the contact system has current-collecting contacts which are cut-in in the places of interconnection of the electromagnets and are adapted to slide over the current-conducting busbars when the chuck rotates, said busbars being fixed to the chuck stationary bed at the boundaries of the zones thereof.

Deenergizing of the electromagnets within the zone of loading workpieces is attained in the known chucks by virtue of opening the contacts of position switches which are so cut into the circuit of the electromagnets that at least one such switch is always found within the zone of loading workpieces when the chuck is rotating.

Opening of the contacts of position switches is effected by a mechanical pusher which actuates the switches over the entire loading zone.

Use of position switches and mechanical pushers renders the operation of such magnetic chucks inadequately reliable, whereas a great number of current-collecting contacts (to suit the number of electromagnets employed) sophisticates the design of the contact system as a whole.

It is therefore an object of the present invention to provide a circular rotary magnetic chuck having a contact system capable of ensuring a reliable operation of the chuck when used in continuous-action machine tools.

It is another object of the present invention to simplify the design of the contact system.

To attain said and other objects, in a circular rotary magnetic chuck, according to the invention, its contact system is made essentially as a ring commutator adapted to interact with current-carrying brushes made fast on the chuck bed at the boundaries of the zones thereof, whereas incorporated into the circuit of the electromagnets are semiconductor diodes capable of admitting electric current to pass through the electromagnets within the zone of machining workpieces and restricting its flow within the zone of loading said workpieces.

It is expedient that the ring commutator be assembled peripherally from separate segments or bars insulated from one another, each of which is connected to the terminals of two adjacent electromagnets so that the commutator segments corresponding to the electromagnets wherebetween semiconductor diodes are connected, are expedient to be split into two concentric insulated bars connected to the opposite poles of said diodes and adapted to be bridged through the brush within the zone of unloading the workpieces so as to preclude gating effect of the diodes upon the passing of demagnetizing current through the electromagnets.

Number of semiconductor diodes should be such that at least one of these be always found within the zone of unloading workpieces.

Such an implementation of the contact system of the herein-disclosed circular rotary magnetic chuck ensures its reliable operation at rather high rotational speeds of the chuck used in high efficiency continuous-action machine tools of the present-day machine-building practice, whereas the provision of semiconductor diodes cut into the circuit of the electromagnets makes the design of the chuck much simpler, thus allowing it to devoid of cumbersome and unreliable position switches with mechanical pushers.

In what follows the present invention is disclosed in a detailed description of an exemplary embodiment thereof with reference to the accompanying drawings, wherein.

The herein-disclosed circular rotary magnetic chuck is adapted for clamping thereon workpieces under machining, mostly on automatic surface grinding machines, wherein loading, machining and unloading of workpieces occur continuously during chuck rotation.

Figure 2:
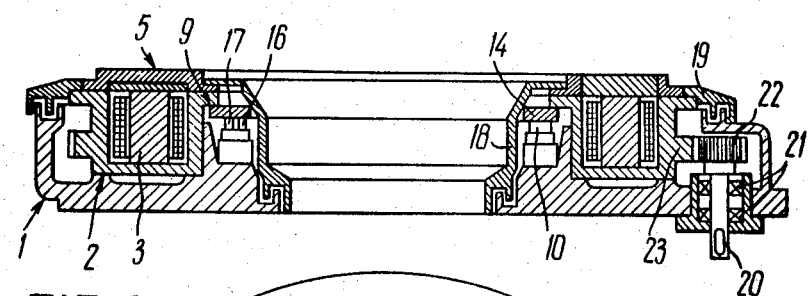
FIG. 2 is a section taken along the line II—II in FIG. 1.
Figure 1:
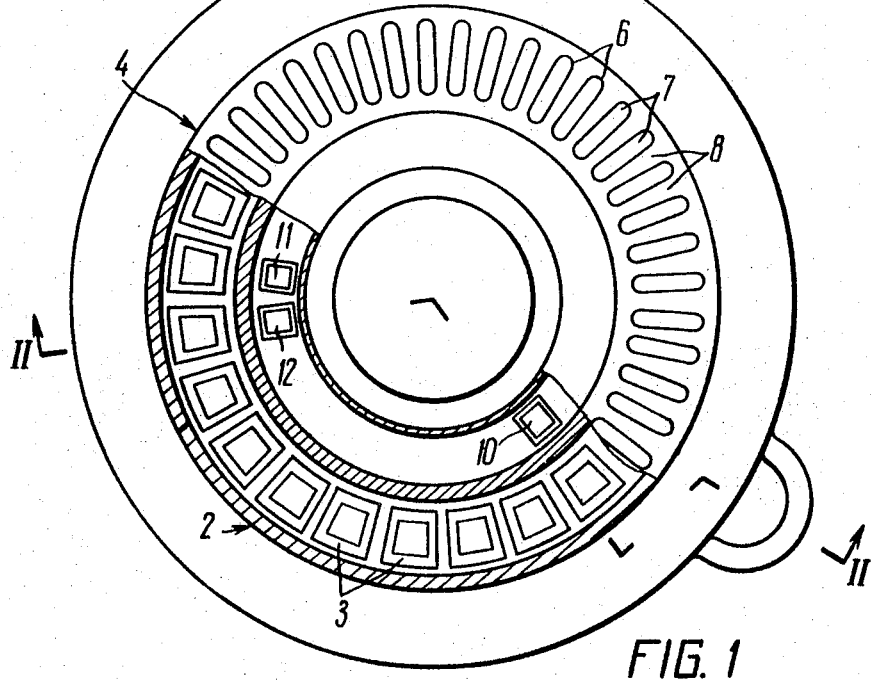
FIG. 1 is a general plan view of a circular rotary magnetic chuck according to the invention, with a portion of its cover broken away.

The chuck comprises the following main units and components (FIGS. 1 and 2):

The chuck has a bed 1 made as a circular ring trough-like in cross-section with circular ways made thereinside.

Mounted on the ways of the bed 1 is a ring-shapedrotary body 2 carrying electromagnets 3 which are equidistantlyspaced along its periphery and connected in series toone another to form a colsed circuit.

The body 2 is closed by an adapter cover 4 on whose outside surface referred to as a face 5 are positioned workpieces to be machined. The cover 4 of the chuck is divided radially by non-magnetic oval-shaped shims 6 into unlike magnetic poles 7 and 8 which form along with the electromagnets 3 a number of magnetic systems equidistantly spaced round equidistantly spaced chuck periphery. Such a construction of the to one 4 permits minor workpieces to closed clamped thereon.

The chuck contact system comprises a ring commutator 9 made fast on the inside surface of the body 2 to rotate along therewith, the three current-carrying brushes adapted to interact with the commutator 9, viz., two working brushes 10 and 11 and a demagnetization brush 12, all of them being held to the chuck stationary bed 1.

Figure 3:
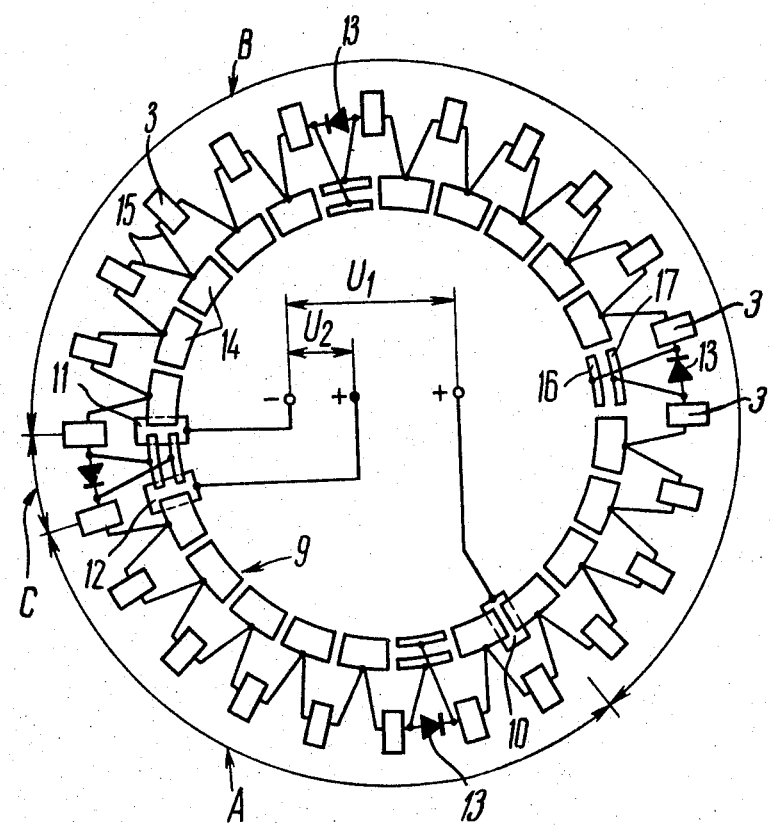
FIG. 3 is a plan view of the chuck connection diagram.

Said brushes 10, 11 and 12 devide the circular surface of the chuck into three sections that will hereinafter be referred to as zones, viz., a zone A (FIG. 3) of loading workpieces under machining, a zone B of machining said workpieces and a zone C of unloading the latter, said zones being arranged in the above-stated sequence to provide a continuous process of machining workpieces.

The working brushes 10 and 11 located at the boundaries of the zones A and B, and B and C, respectively, are to supply working voltage $U_1$ from a D.C. power source, whereas the brush 12 located at the boundary of the zones C and A, supplies demangetizing voltage $U_2$ which is in fact a reduced opposite-polarity voltage.

Four semiconductor diodes 13 are cut into the circuit of the series-interconnected electromagnets 3, said dodes being adequately shared among the latter and so oriented as to admit electric current to pass through the electromagnets 3 within the zone B of machining workpieces to clamp these on the chuck cover, or restrict current flow through said magnets within the zone A of loading workpieces to facilitate their detaching.

Number of the semiconductor diodes 13 may be any but so that at least one diode 13 should always be found within the loading zone A.

The ring commutator 9 of the contact system is assembled from separate segments 14 insulated from one another, each of these being connected to terminals 15 of the two adjacent electromagnets 3 so that the segment 14 of the commutator 9 that corresponds to the electromagnets 3, wherebetween the semiconductor diode 13 is connected, is composed to two concentric bars 16 and 17 insulated from each other and connected to the opposite poles of the respective diode 13.

The contact system and the ways of the chuck bed 1 are enclosed by protective covers 18 (FIG. 1) and 19.

Rotation of the chuck body 2 along the ways of its bed 1 is imparted from a drive (not shown) via a drive shaft 20 running in bearings 21 mounted on the chuck bed 1. Set on the vacant extension of the shaft 20 is a drive pinion 22 which is in mesh with a gear rim 23 made on the outside lateral surface of the body 2.

When mounting the magnetic chuck on a machine, use may be made as the chuck bed of the machine base, whereon ways are to be made and current-carrying brushes of the contact system are fixed.

The chuck is provided with a feeder device adapted to feed workpieces into the loading zone, and a conveyer to transfer the finished items off the unloading zone.

The magnetic chuck operates as follows.

When the chuck body 2 rotates along the ways of its base 1 the electromagnets 3 coming into the workpiece machining zone B, get successively connected by the working brushes 10 and 11 to the source of working voltage $U_1$. Inasmuch as the semiconductor diodes 13 admit electric current to pass through the electromagnets 3 within the machining zone B, the magnetic field established by the electromagnets 3 gets closed through the poles 7 and 8 of the chuck cover 4 and the workpieces clamped thereon, with the result that the latter are attracted to the face 5 of the cover 4, thus becoming clamped on the chuck during their machining.

When the electromagnets 3 come out of the workpiece machining zone B into the zone C of workpiece uloading, they are momentarily connected by the brushes 11 and 12 to the source of demagnetizing voltage $U_2$ to facilitate the detachment of workpieces from the chuck.

The gating effect of the semiconductor diodes 13 upon the flow demagnetizing current through the electromagnets 3 within the unloading zone C is precluded due to the fact that the bars 16 and 17 of the segments 14 of the commutator 9 that are connected to the diodes 13, get bridged by the brush 12.

No electric current flows along the electromagnets 3 within the workpiece loading zone A, since it is restricted by the semiconductor diodes 13.

What we claim is:

1. A circular rotary magnetic chuck for metal-working machines, having the zones of loading, machining and unloading workpieces and comprising: a bed with ways; a body rotating along the ways of said bed; electromagnets arranged along the periphery of said body and interconnected in series; an adapter cover mounted on said body; a contact system which, when said body rotates, successively connects said electromagnets to working voltage within said workpiece machining zone for the workpieces to clamp on said chuck cover or to demagnetizing voltage within said workpiece unloading zone for the workpieces to be easily removed from the chuck; a ring commutator of said contact system held to said chuck body; current-carrying brushes of said contact system made fast on said chuck bed at the boundaries of said zones and adapted to interact with said ring commutator; semiconductor diodes connected into the circuit of said electromagnets so as to admit electric current to pass therethrough within said workpiece machining zone and restrict its flow within said workpiece loading zone.

2. A chuck as claimed in claim 1, wherein the commutator is assembled peripherally from a number of separate segments insulated from one another, each of which is connected to the terminals of two adjacent electromagnets, while the segments corresponding to the electromagnets wherebetween the semiconductor diodes are connected, are divided into two concentric bars which are insulated from each other and connected to the unlike poles of said diodes and are adapted to be bridged by a brush within the workpiece unloading zone to preclude gating effect of the diodes upon the flow of demagnetizing current through the electromagnets.

3. A chuck as claimed in claim 2, wherein the number of semiconductor diodes should be such that at least one of these be always found within the workpiece loading zone.

* * * * *